(12) United States Patent  (10) Patent No.: US 9,508,003 B2
Eguro et al.  (45) Date of Patent: Nov. 29, 2016

(54) HARDWARE-AMENABLE CONNECTED COMPONENTS LABELING

(71) Applicant: Microsoft Technology Licensing, LLC, Redmond, WA (US)

(72) Inventors: Kenneth Hiroshi Eguro, Seattle, WA (US); George E. Smith, Bellevue, WA (US); Shawn Michael Swilley, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/253,696

(22) Filed: Apr. 15, 2014

(65) Prior Publication Data

US 2015/0078672 A1  Mar. 19, 2015

Related U.S. Application Data

(60) Provisional application No. 61/812,232, filed on Apr. 15, 2013.

(51) Int. Cl.
*G06K 9/62* (2006.01)
*G06K 9/00* (2006.01)
(Continued)

(52) U.S. Cl.
CPC ....... *G06K 9/00536* (2013.01); *B29C 67/0051* (2013.01); *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 12/0207* (2013.01); *G06K 9/0063* (2013.01); *G06K 9/00201* (2013.01); *G06K 9/62* (2013.01); *G06T 1/60* (2013.01); *G06T 7/00* (2013.01);
(Continued)

(58) Field of Classification Search
CPC ............ G06F 2207/222; G06F 3/012; G06F 3/04842; G06F 19/24; G06F 12/0207; G06F 17/5045; G06F 2217/66; G06F 17/505; H04L 43/045; G06T 7/0085; G06T 9/20; G06T 17/20; G06T 7/0073; G06T 1/60; G06T 7/00; G06T 19/20; G06T 7/004; H04N 2013/0081; H04N 13/0239; H04N 5/332; G06K 9/468; G06K 9/469; G06K 9/6269; G06K 9/00201; G06K 9/00536; G06K 9/0063; G06Q 20/042; G01B 11/22; G01B 11/25; G01B 11/2513; G01B 11/2527; G01B 11/2545; G02B 27/44; G02B 5/1895
USPC ................ 382/224, 232, 276; 345/420, 440; 713/300, 320, 321; 716/100, 126
See application file for complete search history.

(56) References Cited

U.S. PATENT DOCUMENTS 5,586,200 A * 12/1996 Devaney .................. G06T 9/20
382/232
6,105,139 A * 8/2000 Dey .......................... G06F 1/32
713/300

(Continued)

*Primary Examiner* — Vu Le
*Assistant Examiner* — Aklilu Woldemariam
(74) *Attorney, Agent, or Firm* — Gregg Wisdom; Judy Yee; Micky Minhas

(57) ABSTRACT

The subject disclosure is directed towards performing connected components in hardware, such as an FPGA, which is facilitated by a linked list structure that does not grow. During a connected components graph labeling process, when a merge is encountered, the data structure comprising labels and associated equivalency data swaps the equivalency data of the two vertices whose different labels produced the merge condition.

20 Claims, 16 Drawing Sheets

(51) Int. Cl.
*H04N 5/33* (2006.01)
*H04N 13/02* (2006.01)
*H04N 13/00* (2006.01)
*G02B 27/42* (2006.01)
*B29C 67/00* (2006.01)
*G06F 12/02* (2006.01)
*G02B 5/18* (2006.01)
*G02B 27/44* (2006.01)
*H04N 5/225* (2006.01)
*H04N 9/04* (2006.01)
*H04N 17/00* (2006.01)
*G01B 11/25* (2006.01)
*G06T 7/00* (2006.01)
*G01B 11/22* (2006.01)
*G06T 1/60* (2006.01)
*A63F 13/213* (2014.01)

(52) U.S. Cl.
CPC .............. *G06T 7/004* (2013.01); *G06T 7/0057* (2013.01); *G06T 7/0065* (2013.01); *G06T 7/0073* (2013.01); *H04N 5/2256* (2013.01); *H04N 5/33* (2013.01); *H04N 5/332* (2013.01); *H04N 9/045* (2013.01); *H04N 13/0022* (2013.01); *H04N 13/02* (2013.01); *H04N 13/025* (2013.01); *H04N 13/0239* (2013.01); *H04N 13/0253* (2013.01); *H04N 13/0271* (2013.01); *H04N 17/002* (2013.01); *A63F 13/213* (2014.09); *G06T 2207/30244* (2013.01); *H04N 2013/0081* (2013.01)

(56) References Cited

U.S. PATENT DOCUMENTS

| | | | |
|---|---|---|---|
| 7,634,395 B2* | 12/2009 | Flandrin | G06T 17/20 345/419 |
| 8,442,940 B1* | 5/2013 | Faletti | G06F 17/2785 704/9 |
| 2006/0176306 A1* | 8/2006 | Nagaraj | G06K 9/469 345/440 |
| 2009/0217213 A1* | 8/2009 | Meserve | G06F 17/5045 716/100 |
| 2009/0217214 A1* | 8/2009 | Meserve | G06F 17/5045 716/100 |
| 2010/0042964 A1* | 2/2010 | Meserve | G06F 17/505 716/126 |
| 2010/0277571 A1* | 11/2010 | Xu | G06T 7/0057 348/47 |
| 2011/0078189 A1* | 3/2011 | Bonchi | G06Q 10/10 707/776 |
| 2011/0103711 A1* | 5/2011 | Su | G06T 1/20 382/276 |
| 2012/0154397 A1* | 6/2012 | Chernikov | G06T 17/205 345/420 |

* cited by examiner

| 0 (A) | 0 (A) | 0 (A) | 15 (B) | 15 (B) | 12 (C) |
|-------|-------|-------|--------|--------|--------|
| 15    | 15    | 15    | 15     | 14     | 13     |

Image Disparity Map (current label)

| | | | | | | Current Action | Reset Label | Label 1 | Label 2 | Run Length | |
|---|---|---|---|---|---|---|---|---|---|---|---|
| 0 (A) | 0 (A) | 0 (A) | 15 (B) | 15 (B) | 12 (C) | Generate New Label | Y | D | X | 1 | Cycle 1 |
| 15 (D) | 15 | 15 | 15 | 14 | 13 | | | | | | |
| 0 (A) | 0 (A) | 0 (A) | 15 (B) | 15 (B) | 12 (C) | Generate New Label | Y | D | X | 2 | Cycle 2 |
| 15 (D) | 15 (D) | 15 | 15 | 14 | 13 | | | | | | |
| 0 (A) | 0 (A) | 0 (A) | 15 (B) | 15 (B) | 12 (C) | Generate New Label | Y | D | X | 3 | Cycle 3 |
| 15 (D) | 15 (D) | 15 (D) | 15 | 14 | 13 | | | | | | |
| 0 (A) | 0 (A) | 0 (A) | 15 (B) | 15 (B) | 12 (C) | GNL (emit) | Y | D | X | 3 | Cycle 4 |
| 15 (D) | 15 (D) | 15 (D) | 15 (B) | 14 | 13 | Merge | N | B | D | 1 | |
| 0 (A) | 0 (A) | 0 (A) | 15 (B) | 15 (B) | 12 (C) | Merge | N | B | D | 2 | Cycle 5 |
| 15 (D) | 15 (D) | 15 (D) | 15 (B) | 14 (B) | 13 | | | | | | |
| 0 (A) | 0 (A) | 0 (A) | 15 (B) | 15 (B) | 12 (C) | Merge (emit) | N | B | D | 1 | Cycle 6 |
| 15 (D) | 15 (D) | 15 (D) | 15 (B) | 14 (B) | 13 (B) | Merge | N | B | C | 1 | |
| 0 (A) | 0 (A) | 0 (A) | 15 (B) | 15 (B) | 12 (C) | Merge (emit) | N | B | C | 1 | Cycle 7 |
| 15 (D) | 15 (D) | 15 (D) | 15 (B) | 14 (B) | 13 (B) | | | | | | |

*FIG. 11*

Initial State

| Address | Relabel | Equivalency | Area |
|---|---|---|---|
| A | A | A | 3 |
| B | B | B | 2 |
| C | C | C | 1 |
| D | - | - | - |

*FIG. 12A*

After Processing Action 1 - GNL(D, 3)

| Address | Relabel | Equivalency | Area |
|---|---|---|---|
| A | A | A | 3 |
| B | B | B | 2 |
| C | C | C | 1 |
| D | D | D | 3 |

*FIG. 12B*

After Processing Action 2 - Merge(B, D, 2)

| Address | Relabel | Equivalency | Area |
|---|---|---|---|
| A | A | A | 3 |
| B | B | B | ~~2~~ 7 |
| C | C | C | 1 |
| D | ~~D~~ B | ~~D~~ B | 3 |

*FIG. 12C*

After Processing Action 3 - Merge(B, C, 1)

| Address | Relabel | Equivalency | Area |
|---|---|---|---|
| A | A | A | 3 |
| B | B | ~~B~~ C | ~~7~~ 9 |
| C | ~~C~~ B | ~~C~~ D | 1 |
| D | B | B | 3 |

*FIG. 12D*

Processing - Merge(A, B, 2) Stage 1

| Address | Relabel | Equivalency | Area |
|---|---|---|---|
| A | A | A | 3 |
| B | ~~B~~ A | C | 9 |
| C | B | D | 1 |
| D | B | B | 3 |

FIG. 13A

Processing - Merge(A, B, 2) Stage 2

| Address | Relabel | Equivalency | Area |
|---|---|---|---|
| A | A | A | 3 |
| B | A | C | 9 |
| C | ~~B~~ A | D | 1 |
| D | B | B | 3 |

FIG. 13B

Processing - Merge(A, B, 2) Stage 3

| Address | Relabel | Equivalency | Area |
|---|---|---|---|
| A | A | A | 3 |
| B | A | C | 9 |
| C | A | D | 1 |
| D | ~~B~~ A | B | 3 |

FIG. 13C

Processing – Merge(A, B, 2) Stage 4

| Address | Relabel | Equivalency | Area |
|---|---|---|---|
| A | A | ~~A~~ C | ~~3~~ 14 |
| B | A | ~~C~~ A | 9 |
| C | A | D | 1 |
| D | A | B | 3 |

FIG. 13D

| 15(A) | 15(A) | 15(A) | 15(A) | 15(A) | 15(A) |
|-------|-------|-------|-------|-------|-------|
| 12(C) | <u>14</u> |   |   |   |   |

FIG. 15A

| 15(A) | 12(B) | 12(B) | 12(B) | 12(B) | 12(B) |
|-------|-------|-------|-------|-------|-------|
| 15(A) | <u>14</u> |   |   |   |   |

FIG. 15B

| 0(A) | 0(A) | 12(B) | 12(B) | 12(B) | 12(B) |
|------|------|-------|-------|-------|-------|
| 12(C) | 12(C) | <u>14</u> |   |   |   |

FIG. 15C

| 15(A) | 15(A) | 12(B) | 12(B) | 12(B) | 12(B) |
|-------|-------|-------|-------|-------|-------|
| 12(C) | 13(A) | <u>13</u> |   |   |   |

FIG. 15D

| 0(A) | 0(A) | 0(A) | 15(B) | 15(B) | 15(B) |
|------|------|------|-------|-------|-------|
| 0(A) | 0(A) | 12(C) | 15(B) | 15(B) | 15(B) |
| 13(D) | 13(D) | 13(C) | <u>13</u> |   |   |

FIG. 15E

HARDWARE-AMENABLE CONNECTED COMPONENTS LABELING

CROSS-REFERENCE TO RELATED APPLICATION

The present application claims priority to U.S. provisional patent application Ser. No. 61/812,232, filed Apr. 15, 2013.

BACKGROUND

Connected components is a well known, powerful graph theory technique used to find related data. Example, common uses for connected components is to perform object segmentation or noise removal in image processing.

Many applications of connected components may benefit from parallel processing or other acceleration via hardware (e.g., field-programmable gate array, or FPGA) implementations. However, efficient implementations of connected components are based upon building linked lists to track the similarity between data elements. Linked lists typically require dynamic memory allocation, and are thus not amenable to dedicated hardware implementations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards performing collected components processing in a way that does not grow a linked list, thereby making the processing amenable to hardware. One or more aspects are directed towards performing collected components processing, including labeling vertices of a graph based upon labeling rules, comprising detecting a merge condition when a selected vertex has two intersecting arcs connecting the selected vertex to two labeled vertices labeled with conflicting labels, including accessing a relabeling data structure based upon the merge condition, and propagating a label from one of the labeled vertices to the selected vertex In one or more aspects, a label assignment process is coupled for communication with a label management process, the label assignment process configured to evaluate disparity data between a first data element and each of two neighbor data elements. Based upon the disparity data evaluation, the label assignment process and the label management process configured to communicate to generate and associate a new label with the first data element when a disparity threshold comparison with either of the neighbor data elements is not met, or associate an inherited label with the first data element in which the inherited label is inherited from one neighbor data element when a disparity threshold comparison with the one neighbor data element is met and a disparity threshold comparison with another neighbor data element is not met. Other communication is configured to associate an inherited label with the first data element in which the inherited label is inherited from one neighbor data element when a disparity threshold comparison with both neighbor data elements is met and both neighbor data elements have the same label, or associate an inherited label with the first data element in which the inherited label is inherited from one neighbor data element when a disparity threshold comparison with both neighbor data elements is met and both neighbor data elements do not have the same label, and to perform a merge operation to associate both neighbor data elements with the same label.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 11 is a representation of processing connected component actions according to one or more example implementations.

FIGS. 12A-12D and 13A-13D are example representations of updating connected components with respect to relabeling, equivalency, and area table, according to one or more example implementations.

FIGS. 15A-15E are examples representing potential conflicts between consecutive connected component actions, according to one or more example implementations.

DETAILED DESCRIPTION

Various aspects of the technology described herein are generally directed towards allowing connected components to build linked lists for a fixed number of vertex labels. The linked lists are built in-place, without requiring any significant dynamic memory allocation. The memory requirement and execution time are approximately linear in the size of the graph and the number of vertex labels.

As will be understood, the technology operates via labeling rules and a merging process, including rules based upon disparities between data elements. Data elements are labeled based upon the disparity so that contiguous regions are labeled together. Already labeled elements that differently labeled may be merged to have the same label based upon subsequent data element processing.

It should be understood that any of the examples herein are non-limiting. For instance, benefits are readily apparent in hardware/FPGA scenarios, however the technology may be used in other scenarios, including only in software, or in some combination of hardware and software. Further, pixels are exemplified, but the technology is not limited to pixel data elements/image processing. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data processing and/or connected components in general.

Figure 1:
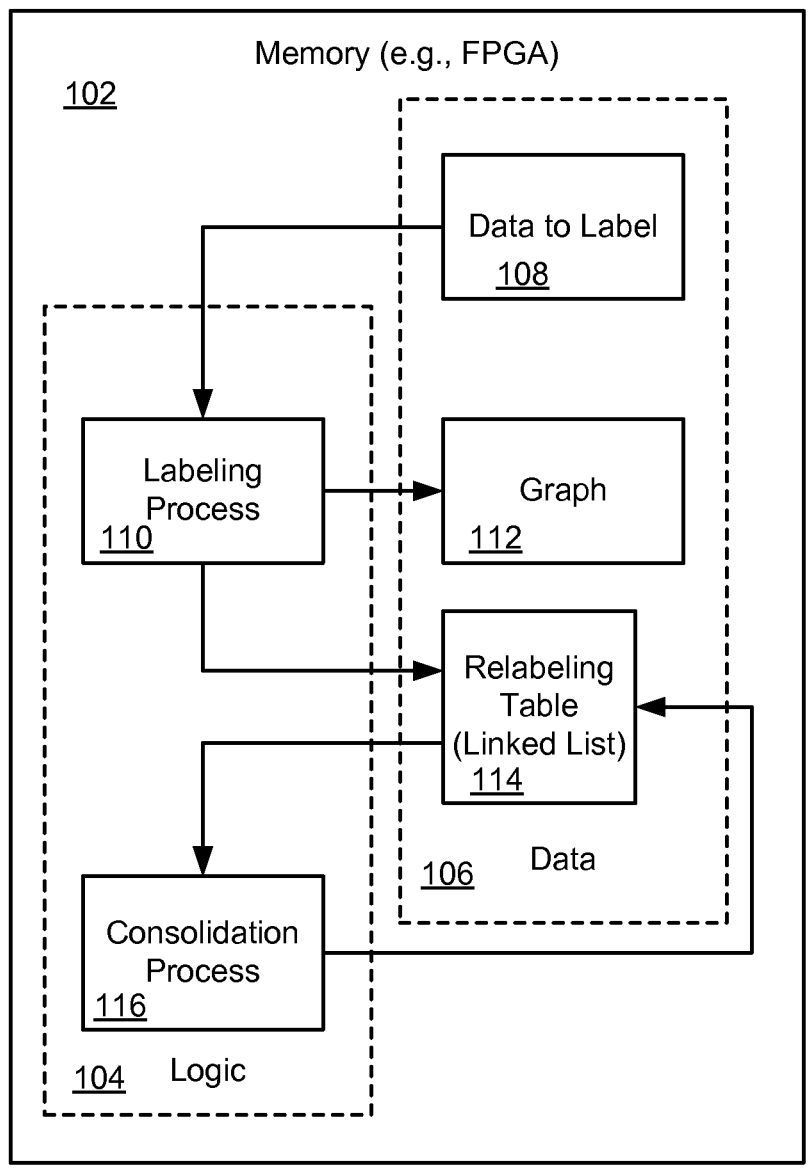
FIG. 1 is a block diagram representing example components that may be used to perform connected components, including in a FPGA, according to one or more example implementations.

FIG. 1 shows an example system in which connected components may be performed in hardware (e.g., FPGA) memory 102 configured with logic 104 and data 106. Data to be labeled 108 are processed by a labeling process 110 into a graph 112 of vertices (nodes) and arcs and an associated relabeling table 114. The relabeling table is then processed by a consolidation process 116 so that differently labeled vertices in the graph that are connected are grouped together.

By way of example, connected components may be performed on a two-dimensional (2D) image. In such a scenario, each pixel in the image is a vertex and each pixel is connected to each of its nearest neighbors with an arc. For simplicity pixels and neighbors may be referred to herein rather than vertices and arcs, however it is understood that this is only one example, and that the same general approach may be performed on an arbitrary graph. Similarly, in the examples herein, "interesting/non-interesting" or "similar/dissimilar" cost functions are mentioned, however the same general approach described herein can be performed with arbitrary functions.

Figure 2A:
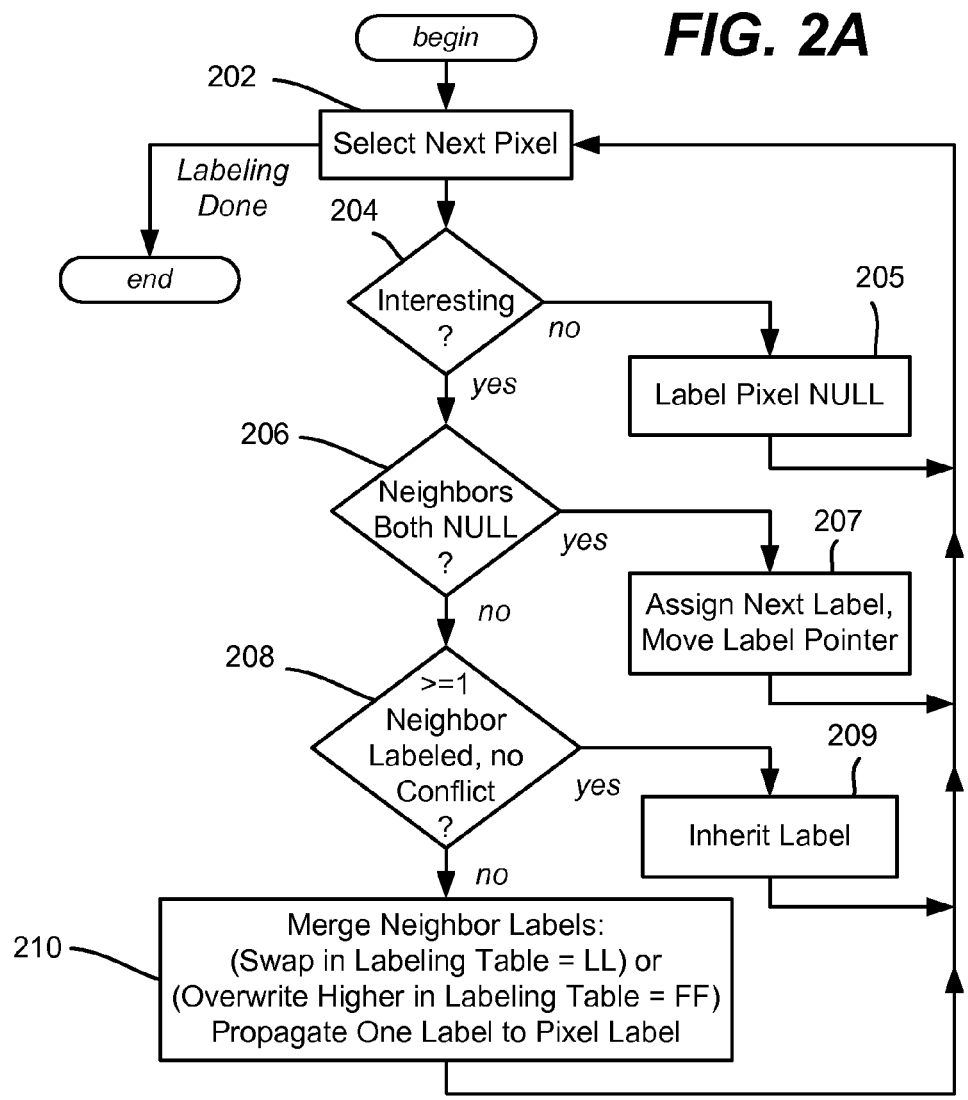
FIG. 2A is a flow diagram representing steps for labeling a graph to perform connected components, according to one or more example implementations.
Figure 2B:
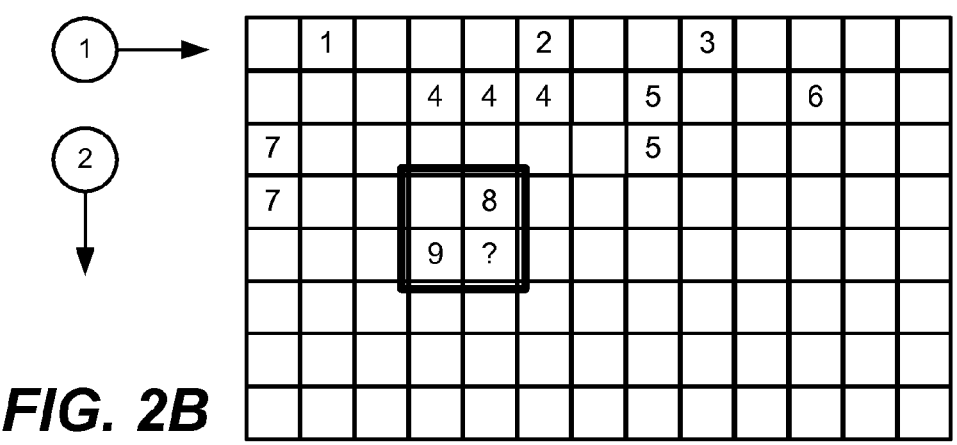
FIG. 2B is a representation of input data being processed for connected components labeling, according to one or more example implementations.

As shown in FIGS. 2A and 2B, the image is walked by selecting pixels (step 202) and processing each one, such as from left-to-right (arrow (1), then down to the next row (arrow (2)). In this example, consider that the labeling process 110 includes a function by which at each pixel the process evaluates whether the pixel is "interesting;" (e.g., in this example, the image is monochrome) whereby a function may consider white pixels as uninteresting and dark pixels interesting. At step 204, if the selected pixel is not "interesting" it is "labeled" as NULL (e.g., marked as zero) at step 205; note that in this example, a pixel labeled NULL also may be referred to as "unlabeled" for purposes of brevity.

If the pixel is interesting, the pixel (i.e., the corresponding node in the graph) is labeled according to the following rules, based upon comparing the pixel with its left and above neighbors, (if any; if on an edge, a missing neighbor is considered unlabeled). Note that FIG. 2B shows the labeling occurring at an interesting "pixel," however it is understood that the interesting pixel has a vertex (node) in the graph that is being labeled with a node address according to the labeling rules. As used herein, labeling a "pixel" refers to associating the pixel with a node in the graph that has a label corresponding to its address.

At step 206, if the left and above neighbors are unlabeled (labeled NULL), the pixel is given a unique label at step 207, e.g., assigned from 1 to N in monotonically increasing order as needed. The next label to be allocated is tracked with a single pointer. As seen in FIG. 2B, pixels labeled one (1) through nine (9) were considered to be interesting (e.g., dark pixels in this monochrome example).

If not both NULL at step 206, step 208 is evaluated to determine whether one of the neighbors has a label while the other is not labeled (is marked NULL), or whether both have the same label. In other words, there is no conflict between the neighbors with respect to a non-NULL label. In this situation, the (non-NULL) label is inherited as the label for the currently selected pixel at step 209. Thus, for example, it is seen in FIG. 2B that the label four (4) has been inherited by two neighbor pixel nodes, the label (5) has been inherited by one neighbor pixel node, and the label seven (7) has been inherited by one neighbor pixel node.

The remaining possibility is that both neighbors are labeled, but with different labels (there is a conflict). Step 210 processes this situation, via a merge operation and by propagating one (e.g., the lower value) of the two conflicting labels. The merge operation is described below, including a swapping technique in a linked list operation or an overwriting technique in a pure feed-forward operation. As will be understood, the pure feed-forward operation results in less efficient (overall) connected components processing.

Figure 3A:
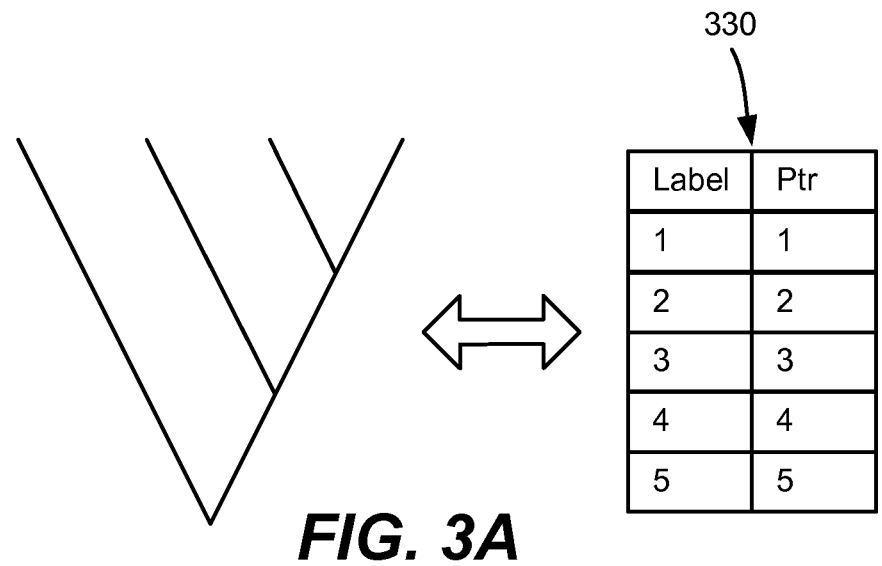
FIGS. 3A and 3B are representations of traversing a graph while maintaining a relabeling table (linked list), according to one or more example implementations.
Figure 3B:
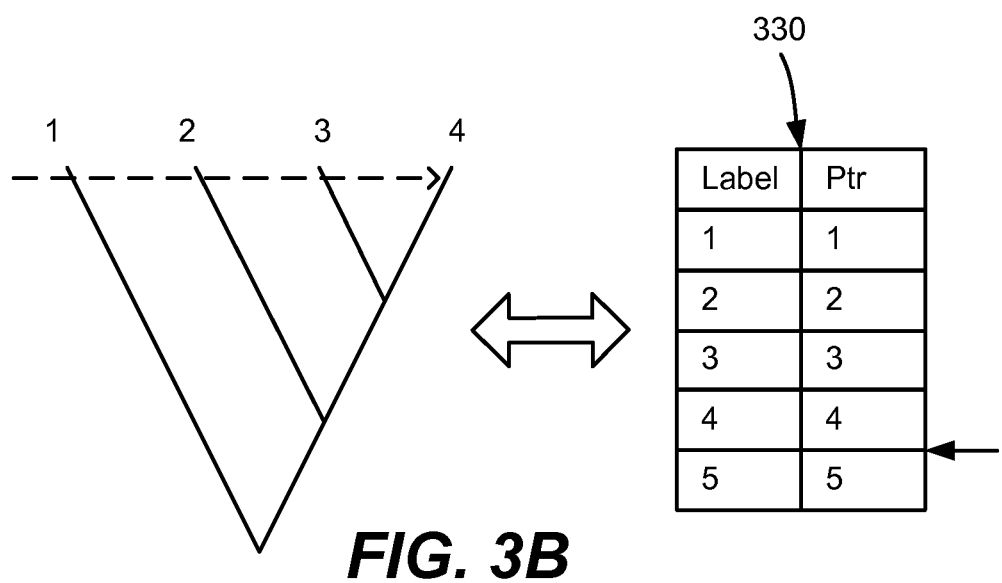

FIGS. 3A and 3B graphically represent the start of the traversing/labeling process 110 and with an accompanying relabeling table 330 (e.g., an instance of the table 114 in FIG. 1). Connected components as described herein may be performed by initializing the relabeling table 330 with self-pointers, that is, each label contains its own address, as in FIG. 3A. The labeling process traverses the graph in a first pass. For this image, the process starts at the top left corner, proceeds right in raster order, and continues down to the bottom right corner.

As can be seen in the differences from FIG. 3A to FIG. 3B, as the labeling process 110 traverses the top of row of the image, the labeling process 110 provides each of the initial limb stubs with a unique label, from 1 to 4 in this example, (following one raster line). Note that a pointer to the next unique label to be used has moved up with each label added, and thus after the labeling state shown in FIG. 3B, the next label to use will be five (5), as indicated by the small arrow in FIG. 5A.

Figure 4A:
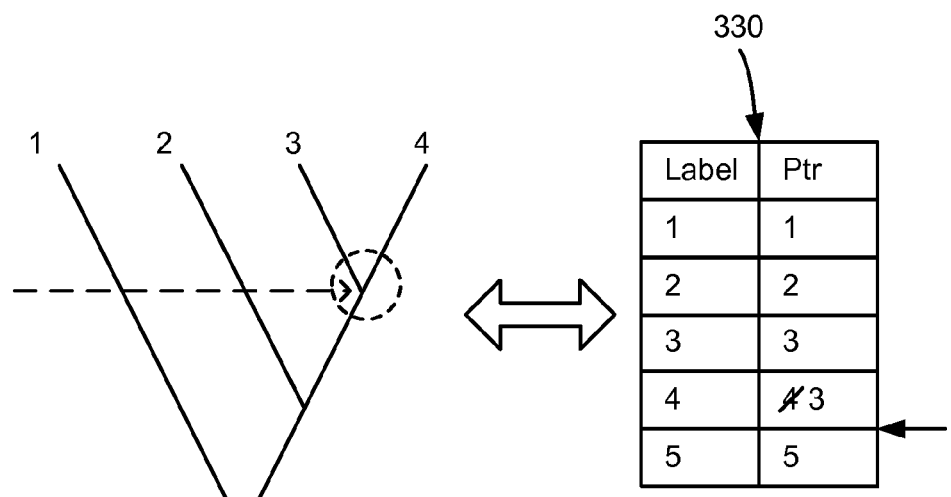
FIGS. 4A-4C are representations of one alternative for traversing the graph (following the traversal in FIGS. 3A and 3B), including modifying the relabeling table as merge conditions are encountered using a feed forward (overwriting) technique, according to one or more example implementations.
Figure 5A:
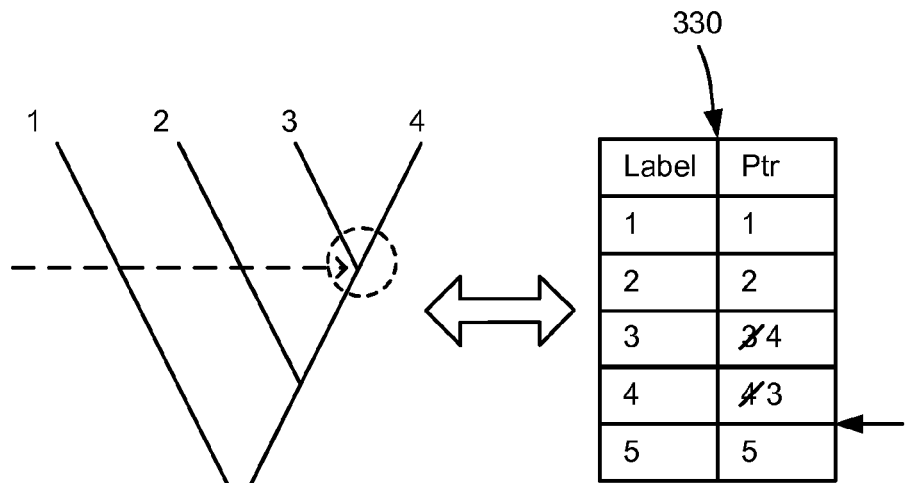
FIGS. 5A-5C are representations of another alternative for traversing the graph (following the traversal in FIGS. 3A and 3B), including modifying the relabeling table as merge conditions are encountered using a linked list (swapping) technique, according to one or more example implementations.

The following row propagates the labeling for limbs 1 and 2 as shown in either FIG. 4A (representing the pure feed-forward technique) or FIG. 5A (representing the linked-list technique). However, in this row, when the intersection of limbs 3 and 4 is reached, a decision needs to be made because both the left and above pixels are labeled, but they have different labels. For simplicity one implementation propagates the lower of the two labels, shown by the dashed line Pr3.

Figure 4B:
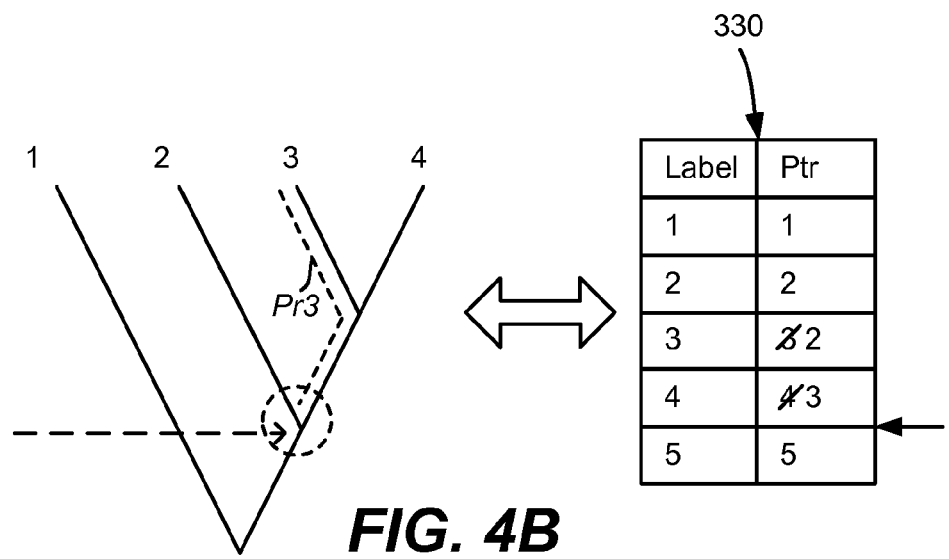
Figure 4C:
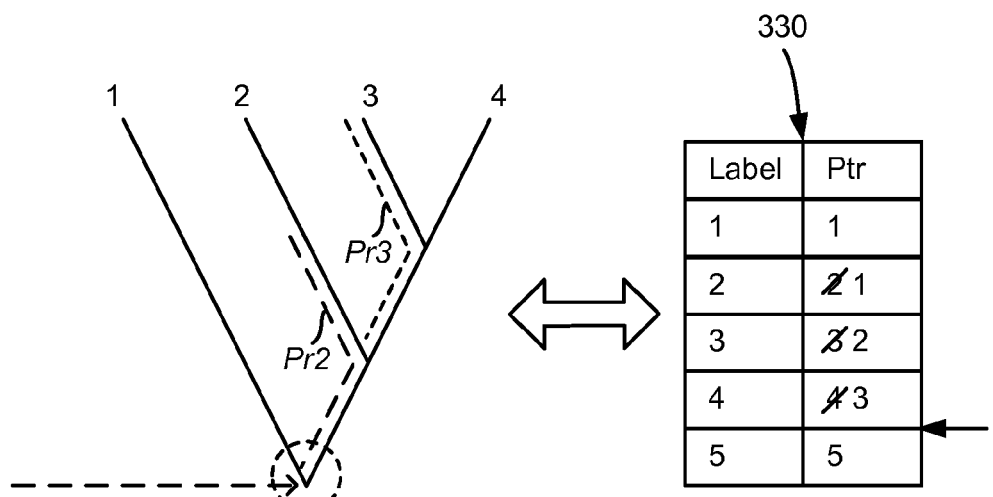
Figure 5B:
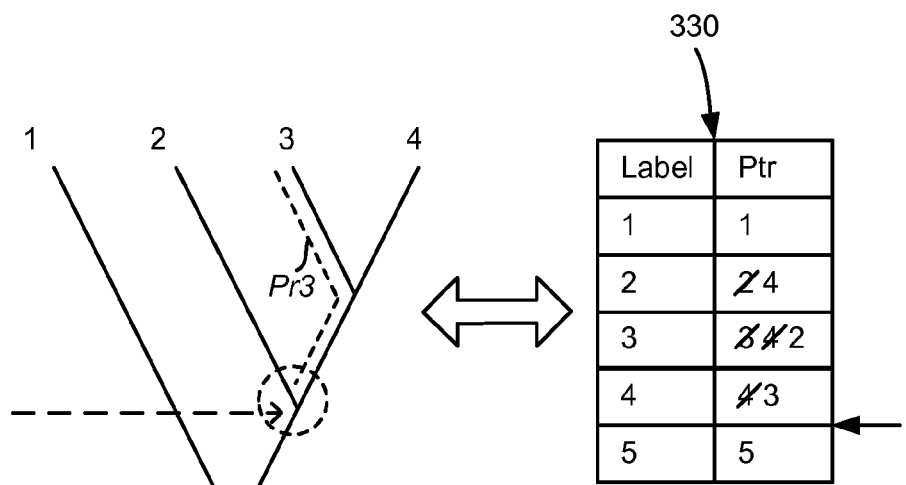
Figure 5C:
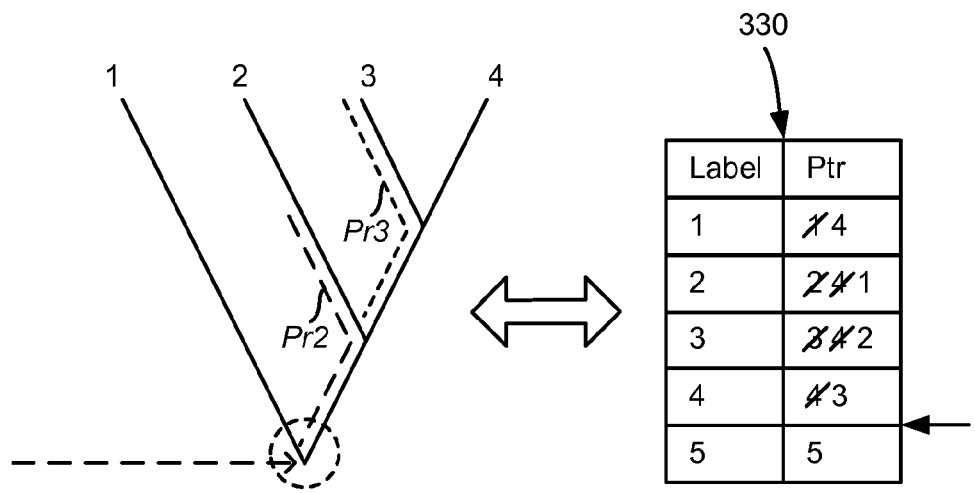

FIGS. 4A-4C and 5A-5C show two alternative labeling methods to perform connected component processing continuing after the first row was completed (in FIGS. 3A and 3B), namely pure feed-forward labeling (FIGS. 4A-4C) and linked-list labeling (FIGS. 5A-5C). One or the other is used, however as described below, the linked-list labeling may be significantly more efficient during consolidation.

In a straightforward pure feed-forward labeling, when the first merge is encountered, shown at the vertex in FIG. 4A (circled for visibility), the feed-forward labeling process overwrites the entry pointer entry representing the higher label in the relabeling tree with the label of the lower label. This is shown in FIG. 4A by the pointer for label four (value '4') being overwritten by a lower pointer (value '3'). Note that the pointer (value '4') is replaced in memory by the pointer (value '3'), and thus no additional memory is used, but for purposes of explanation/illustration, the replaced value is shown as "crossed-out" in the table 330; (crossing out to represent replacement is used throughout FIGS. 4A-5C).

In contrast, in the linked-list algorithm represented in FIG. 5A, the labeling process swaps the two entries in the relabeling table 330, whereby the previous pointer for label four (value '4') now has the (value '3') and the previous pointer for label 3 (value '3') now has the (value '4'). As described herein, one of the two labels, e.g., the lower numerically, is propagated (Pr3, FIG. 4B) to mark the current pixel.

As shown in FIGS. 4B and 5B, this labeling continues on the next line until the process reaches the intersection of the second and third (now relabeled) limb. Again, in the pure feed-forward labeling technique of FIG. 4A, the pointer entry representing the higher label (previous value '3') in the relabeling table is overwritten (with value '2'). Pr3 shows the propagation of the lower label to the currently selected pixel.

In the alternative, linked-list technique of 5B, the two entries are swapped. This means that label three's pointer (which was previously swapped to value '4') is again swapped, this time to value '2;' (label two's pointer becomes that '4'). Pr3 shows the propagation of the lower label to the currently selected pixel.

This process continues to the bottom of the image, as represented in FIG. 4C or FIG. 5C, where it can be seen how overwriting versus swapping changes the pointer values in the table. In both FIG. 4C and FIG. 5C, Pr2 shows the propagation of the lower label to the currently selected pixel.

After making the pass through the image, a consolidation process 116 (FIG. 1) consolidates the equivalent labels.

The consolidation process begins at the top of the relabeling table. In the feed-forward labeling example, FIG. 4C shows the ending state of the table after labeling, e.g., with label, pointers pairs of (1, 1), (2, 1), (3, 2), (4, 3) and (5, 5). Consolidation operates to group connected pixels with one another using the table.

Thus, in this feed-forward labeling example, the consolidation process begins with the relabeling table produced by the feed-forward labeling process. In general, in the table, if a label entry points to itself as the pointer address, that label is a unique label. However, if a label does not point to itself, the consolidation process needs to traverse an indeterminate number of other labels to find the "master" equivalent label (a label that points to itself). Label entry 2 points to label entry 1, and 1 points to itself. Label entry 3 points to 2, entry 2 points to label entry 1 and label entry 1 points to itself. Label entry 4 points to label entry 3, label entry 3 points to label entry 2, label entry 2 points to 1 and label entry 1 points to itself. Note that in this simplified example, it is feasible for the consolidation process to reduce the number of traversals by immediately overwriting the relabeling table entry, but this is not generally true; thus the consolidation can require multiple "pointer chasing" iterations (for instance, had the consolidation process started consolidation at label 4, the consolidation process would have gone through the maximum number of label visits). This is more likely to occur if the consolidation process uses more complex equivalency functions.

However, in the linked-list implementation, because of the swapping, each group of equivalent labels forms a closed loop. This is shown in FIGS. 6A-6D, FIGS. 7A and 7B and the example steps of FIG. 8. In FIG. 8, the consolidation process begins at the top of the relabeling table (steps 802 and 804). At step 806, any label that points to itself is a unique label.

Figure 6A:
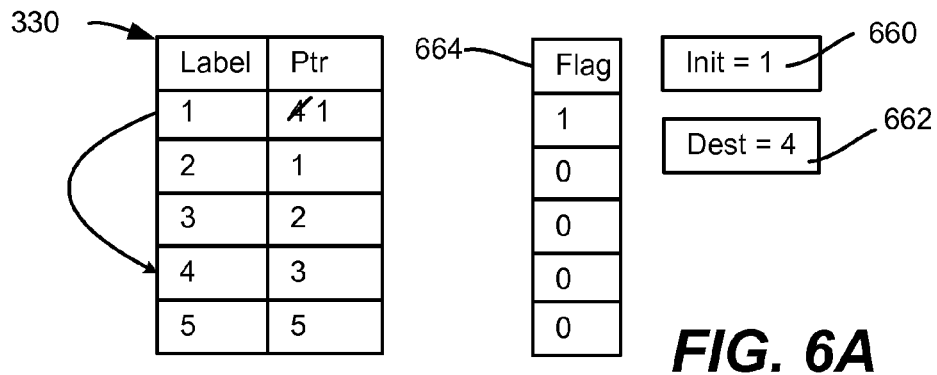
FIGS. 6A-6D, and 7A and 7B, are representations of how relabeling tables may be processed by an example consolidation process, according to one or more example implementations.
Figure 6B:
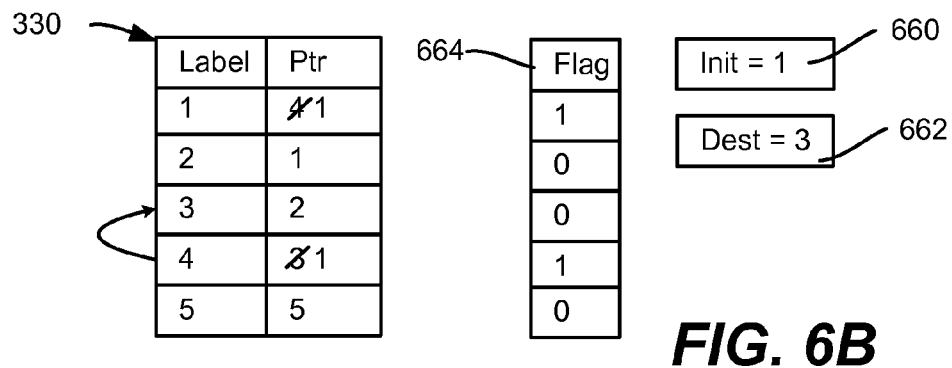
Figure 6C:
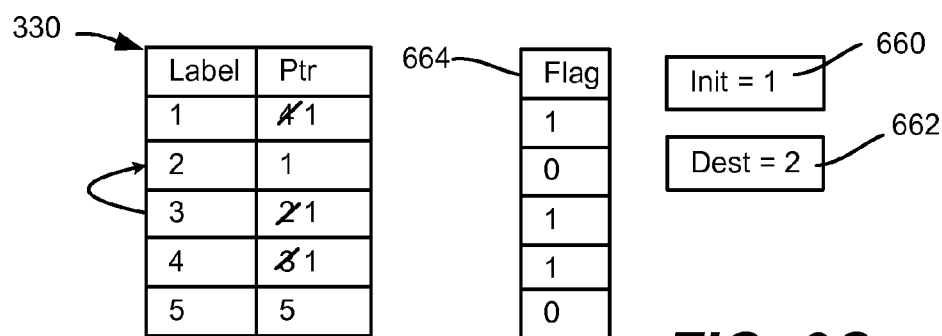
Figure 6D:
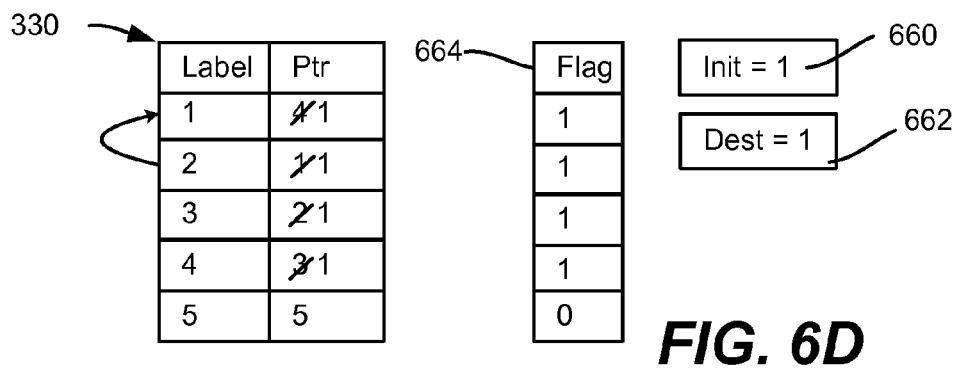

However, if the label does not point to itself, the consolidation process notes the initial label (the label address) in this example ('1') in a memory location 660 (as shown in FIG. 6A) at step 808. The consolidation process also notes the destination pointer address in this example ('4') in a memory location 662 (as shown in FIG. 6A) at step 810, replaces the destination address with the initial address ('1') at step 812, marks the node as visited. e.g., represented by the flags 664 (as shown in FIG. 6A) at step 814, and travels to the destination address (noted in location 662) at step 816.

As represented by step 818, if the destination label (the node at that address) has been visited, the consolidation process travels back to the initial label (1) and finds the next monotonically increasing unvisited label less than the maximum allocated label. If the destination label has not been visited, the consolidation process loops back to step 810 to note the destination address (3), replaces the destination address with the initial address (1), marks the node as visited and travel to the destination address (3).

As can be seen by following the curved arrows in FIGS. 6A-6D, because of the closed loop resulting from swapping, and with only a very small amount of memory (e.g., for the initial label memory location 660 and destination pointer memory location 662), the consolidation process 116 visits each allocated label at most one time, making the traversal linear time.

Figure 7A:
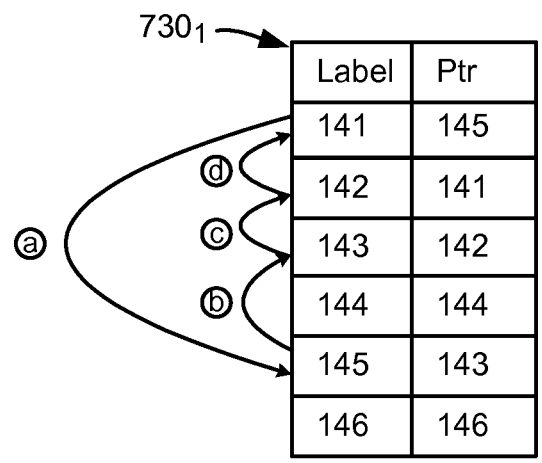
Figure 7B:
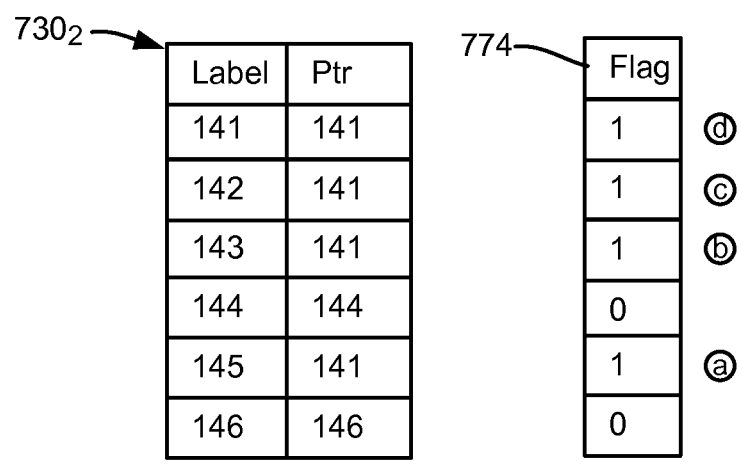
Figure 8:
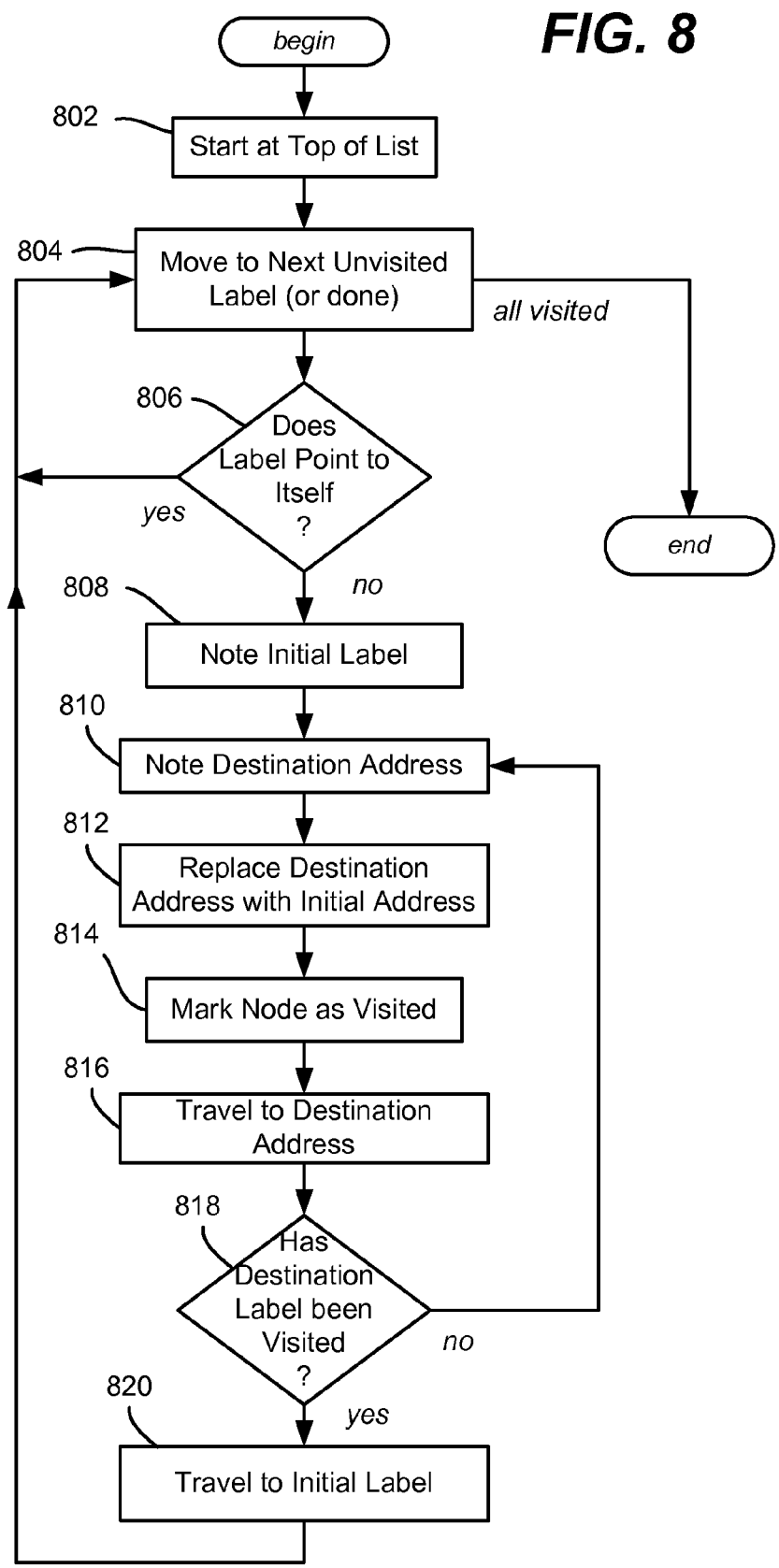
FIG. 8 is a flow diagram representing example steps of a consolidation process, according to one or more example implementations.

FIGS. 7A and 7B show how a different relabeling table instance 730₁ is changed by the process in FIG. 8 to a new, consolidated instance 730₂, even when another label (144) is between the entries forming a closed loop. Thus, starting at label 141, the curved arrow (a) in FIG. 7A indicates the traveling to the pointer destination 145, the arrow (b) from 145 to 143, the arrow (c) from 143 to 142, and the arrow (d) from 142 to 141, which has already been visited at the start of this closed loop's consolidation process.

Although each individual pointer replacement (at step 812 of FIG. 8) with the initial label destination is not shown in FIG. 7A, it can be readily appreciated that each "travel" arrow (a)-(d) in FIG. 7A (step 816 of FIG. 8) corresponds to a replacement at step 812. Thus, the resulting table instance 730₂, after consolidation completes on this particularly closed loop completes, appears as in FIG. 7B. Note that the label 144 was not touched during this particularly closed loop processing, as indicated by the flag for node 144 not being set among the "visited" flags 764; (the identifiers (a)-(d) of the travel arrows in FIG. 7A are also used to indicate the associated marking of a flag in FIG. 7B). Thus, the next label that will be processed for consolidation purposes is label 144.

It should be noted that the technology described herein is not limited to detecting two conflicting connected vertices (neighbor nodes), but may evaluate conflicts and handle merge conditions among three or more neighbors. As can be understood, multiple stages of swapping may be used to handle such merge conditions, with one value from a conflicting node propagated to the selected node for labeling it.

Further, while the above technology eliminates the need for a linked-list that grows, whereby dynamic memory allocation is needed, it is feasible to allocate some memory statically in advance in hardware to provide a "partial" linked list. For example, if hardware has sufficient extra memory for a given set of data to process, the relabeling table may maintain more than one pointer per label.

Pixel-Based Example Implementation

Figure 9A:
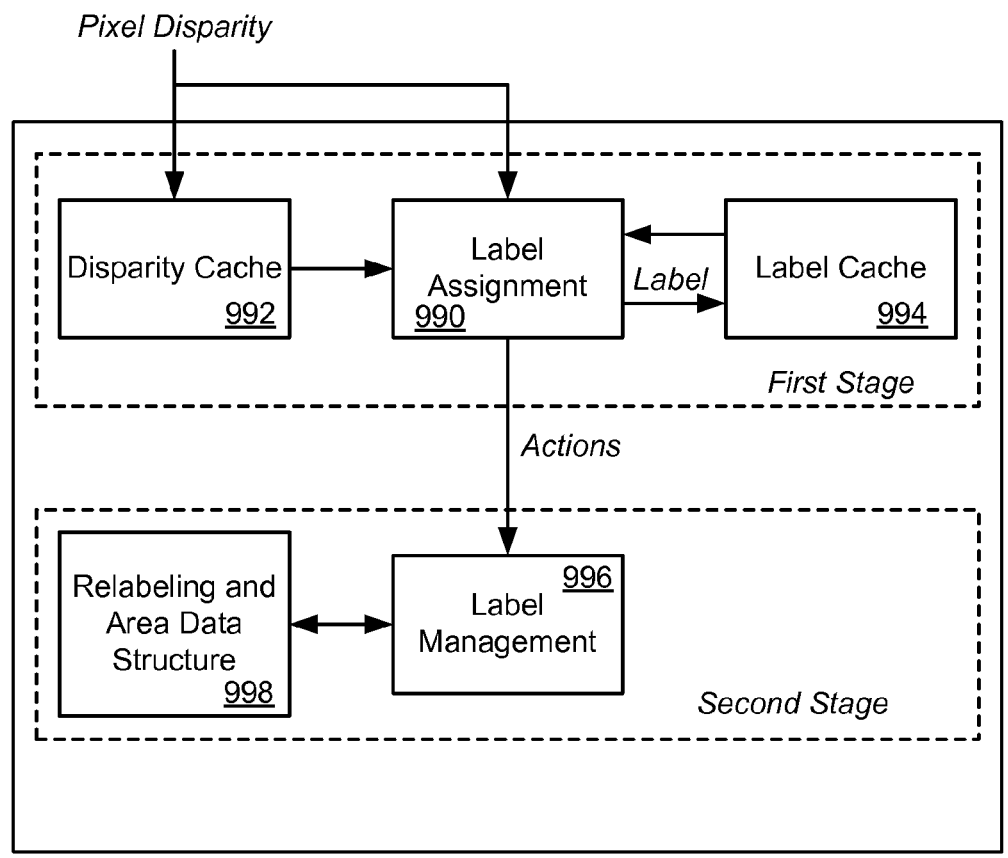
FIG. 9A is a block diagram representing example components that may be used to perform connected components processing in two stages, according to one or more example implementations.

In one or more example embodiments, the connected component technology (e.g., implemented as an engine/process) described herein may be sub-divided into two main stages. A first label assignment stage/process (FIG. 9A) comprises components 990, 992 and 994 that in general operate to compare the disparity (e.g., a difference computation) for each pixel (FIG. 9B) with that of its neighbors. This stage, managed by a label assignment component 990, assigns a label to each pixel, where pixels that share a common label indicate a cohesive region. This stage also emits actions to a second, label management stage/process of the connected component processing, described below.

Figure 9B:
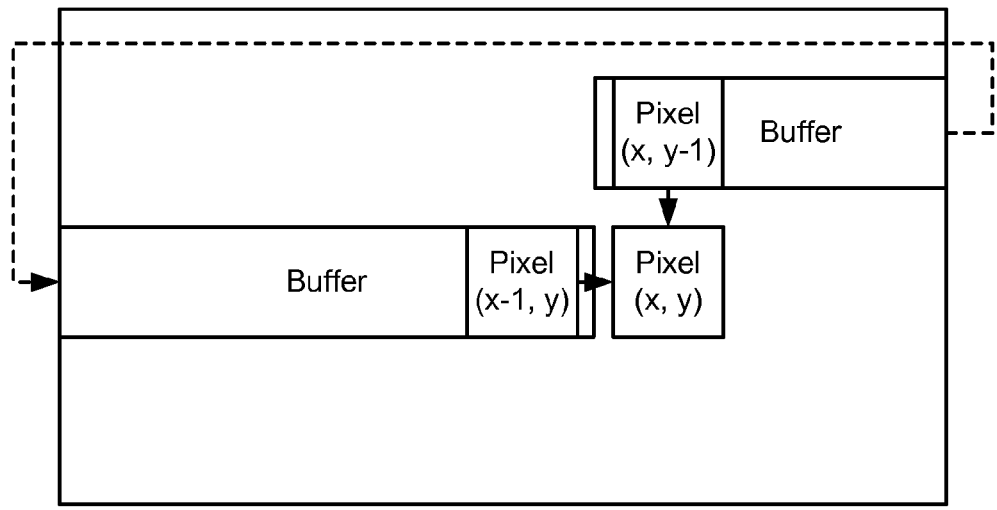
FIG. 9B is a representation of connected components processing a current data element based upon neighbor element comparison and their labels, as well as buffering, according to one or more example implementations.

As shown in FIG. 9B, the connected components engine/process in this example computes in raster-scan order, comparing the disparity of each (x, y) data element (e.g., pixel) with its immediate neighbors to the left (x−1, y) and above (x, y−1) to assign a label. To enable stream processing, one or more implementations buffer one row of both disparity and label information so as to efficiently access the values for the above neighbor. These are shown as a separate disparity cache 992 and label cache 994 in FIG. 9A, but it is understood that they may be combined into a single queue (e.g., the queue has N stages to hold the entire width of the image, storing the values for each location side by side).

Figure 10:
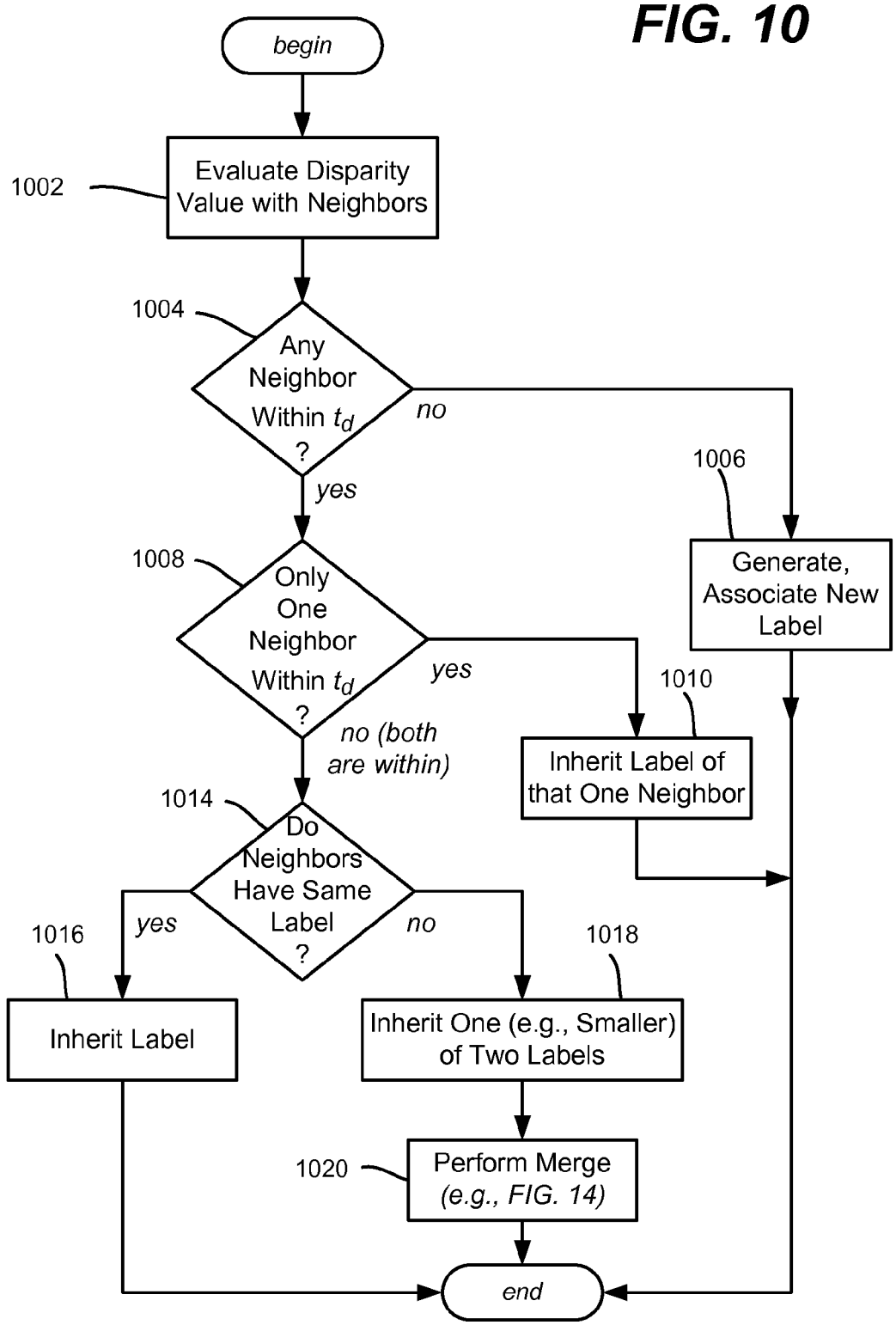
FIG. 10 is a flow diagram representing example steps of processing via labeling rules, according to one or more example implementations.

As generally represented in the example flow diagram of FIG. 10, when the process compares the current data element (e.g., pixel) with its neighbors (step 1002), there are three possible outcomes:

1) The disparity of the current data element is not within a disparity-based threshold ($t_d$) of either its neighbors at step 1004. Because the current data element is disjoint to both neighbors, this represents the beginning of a new region and the current data element is assigned a new label at step 1006. The label assignment block assigns new labels in sequential order from 1 to N. Thus, tracking the next pending new label may be accomplished by incrementing a counter, for example.
2) The disparity of the current data element is within $t_d$ of only one neighbor (step 1008). If so, at step 1010 the current data element inherits the label of that neighbor, "connecting" the two to indicate that they belong to the same region.
3) If neither step 1004 or 1008 provided the outcome, then the disparity at the current data element is within $t_d$ of both neighbors. The labels of these neighbors are compared at step 1014.

Regarding outcome 3), if the labels for both neighbors are the same at step 1014, the current data element inherits this label at step 1016. Conversely, if the labels for the neighbors are different at step 1014, this means that although the two labels were initially designated as unique regions, they are in fact part of a larger continuous region. The two labels may be considered equivalent and the two labels are "merged" at step 1020 as described below with reference to FIGS. 11-15E. The current data element inherits one of (e.g., the smaller in one implementation) of the two labels (step 1018).

In one or more implementations, the label assignment component 990 thus generates one of three actions, including generate a new label (step 1006) for association with the data element, inherit a label (step 1010 or step 1016) from a neighbor for association with the data element, or inherit a label for association with the data element from a neighbor and merge together with another label (step 1018 and step 1020). These actions are sent to the next stage of the system for processing. For example, the action data may be communicated between the stages using the fields exemplified in the below table:

|  | Reset Label | Label 1 | Label 2 |
| --- | --- | --- | --- |
| Generated new label L | Yes | L | X |
| Inherited label L | No | L | 0 |
| Inherited label $L_1$ and merged label $L_2$ with $L_1$ | No | $L_1$ | $L_2$ |

In one or more embodiments, the Reset Label field comprises a one-bit binary value, and label $L_1$ and label $L_2$ are log(N)-bit values where N is the maximum number of labels the system can track.

The second stage of the connected components engine/process includes a label management component 996 that processes the actions generated by the label assignment component 990. This stage tracks the number of pixels that are assigned to a given label (e.g., the area of the corresponding region) using a relabeling and area data structure 998, e.g., a lookup table. As described herein, this second stage also tracks label equivalency, that is, the initial labeling process may discover that two regions that were earlier thought to be distinct (and thus assigned different labels), are actually different parts of a single contiguous surface. In this situation, the previously assigned labels are considered equivalent to one another. This label equivalency is also tracked in the relabeling and area data structure 998, in association with the area values. Note that having the two stages facilitates processing data in a streaming manner and provides for efficient processing as described herein, however it is understood that alternative implementations are feasible, including one in which the label assignment component and the label management component are subcomponents of a larger single component. Thus, although the label assignment process and the label management process are shown as separate components, the processes may be part of a larger component, or further divided into more components.

FIG. 11 shows an example of an action combining for a six-pixel wide image (where A, B, C and D are addresses and the numerical values 0, 12, 13, 14, 15 are example disparity values). The initial state shown begins assuming that the first row has been labeled and the process is just starting to label the second row. During Cycle 1, the first pixel gets a new label (D) because it has no left neighbor and it does not match with the above neighbor. However, this action is not emitted because it is the first action in the row. During Cycle 2, the current pixel is detected as extending the D label (as it is "matched" with the left neighbor but not the above). Thus, the length of the previous action's run is updated, but the action is not emitted. A similar situation occurs during Cycle 3.

During Cycle 4, the disparity for the current pixel matches with both the above and left neighbor, but they do not have the same label. Thus, the process emits the previous action and begin a new action (merge D into B). During Cycle 5, B continues to propagate, so this action is combined with the previous (update the run length, but do not emit). During Cycle 6, C is merged into B. This is a new merge, so although B continues to propagate the process emits the previous action and creates a new action. During Cycle 7, processing is begun on the next row and thus emits the previous action.

As described herein, the second stage of the connected components engine/process is responsible for tracking region area and equivalency by processing the actions generated by the label assignment stage. In one or more example implementations, the label management component 996 performs this duty using a table with three entries for each of the labels the system is capable of tracking. As shown in FIGS. 12A-12D and FIGS. 13A-13D, these entries are Relabel, Equivalency and Area.

While the Area field simply holds the size, there is a difference between the Relabel and Equivalency fields (which tends to be somewhat subtle). More particularly, after each action has been processed, the Relabel field for each entry indicates the smallest label that is equivalent to the given entry (e.g., the "head" of the labels that are equivalent to the given label). For example, FIG. 12D illustrates the system state after processing "action 3". In this case, the Relabel entry for address B, C and D each point to B. Conversely, the Equivalency field tracks a circular linked list for equivalent entries. In this example, the Equivalency field for address B points to C, C points to D, and D points back to B, forming a circular list. Although the two fields seem to provide identical information (ultimately, the potential equivalency of the various labels), the two fields are used in different capacities when processing actions.

When the Label Tracking stage of the Connected Components system receives a Generate New Label command, this is reflected in the tracking table by performing the following operations:

```
Generate New Label (L, Run Length){
    Relabel[L] = L;
    Equivalency[L] = L;
    Area[L] = Run Length;
}
```

As can be seen, the three entries for label L are overwritten. The Relabel field is set such that L points to the smallest label to which it is equivalent (i.e., itself), the Equivalency field is set such that L contains a one-entry linked list to itself (i.e. L is only equivalent to itself) and the Area field is set to equal the number of consecutive "matching" pixel disparities the label assignment stage discovered since generating the new label.

When the label tracking stage of the connected components system receives an inherit label command, additional pixels need to be added to an existing labeled region. This is reflected in the tracking table by performing the following operation:

```
Inherit Label (L, Run Length){
    Area[Relabel[L]] += Run Length;
}
```

As seen, the Area entry for the label that L points to is incremented by the number of consecutive "matching" pixel disparities the label assignment stage found that are also part of the previously discovered region. The process increments the area for the label to which L points (i.e. Area[Relabel[L]] rather than strictly Area[L]) because L may have been superseded by another label. This is the "head" of the group of labels to which L is equivalent. For example, as shown via FIGS. 12C and 12D, after action 2 is processed, the label D is no longer "valid" for future actions (in the sense that, until address B itself is merged with another label, potential future inherits or merging that may reference pre-existing D labels are to be performed with regards to B instead).

When the label tracking stage of the connected components process/engine receives a Merge Label command, this is reflected in the tracking table by performing the following series of operations:

```
Merge Label (L₁, L₂, Run Length){
    If(Relabel[L₁]!=Relabel[L₂]){
        tempLabel = Relabel[L₂];
        mergeLabel = Relabel[L₂];
        Do{
            Relabel[tempLabel] = Relabel[L₁];
            tempLabel = Equivalency[tempLabel];
        } while (tempLabel != Relabel[L₂]);
        Area[Relabel[L₁]] = Area[Relabel[L₁]] + Run Length +
            Area[mergeLabel];
        Swap Equivalency[Relabel[L₁]] and Equivalency[tempLabel];
    }
}
```

Figure 14:
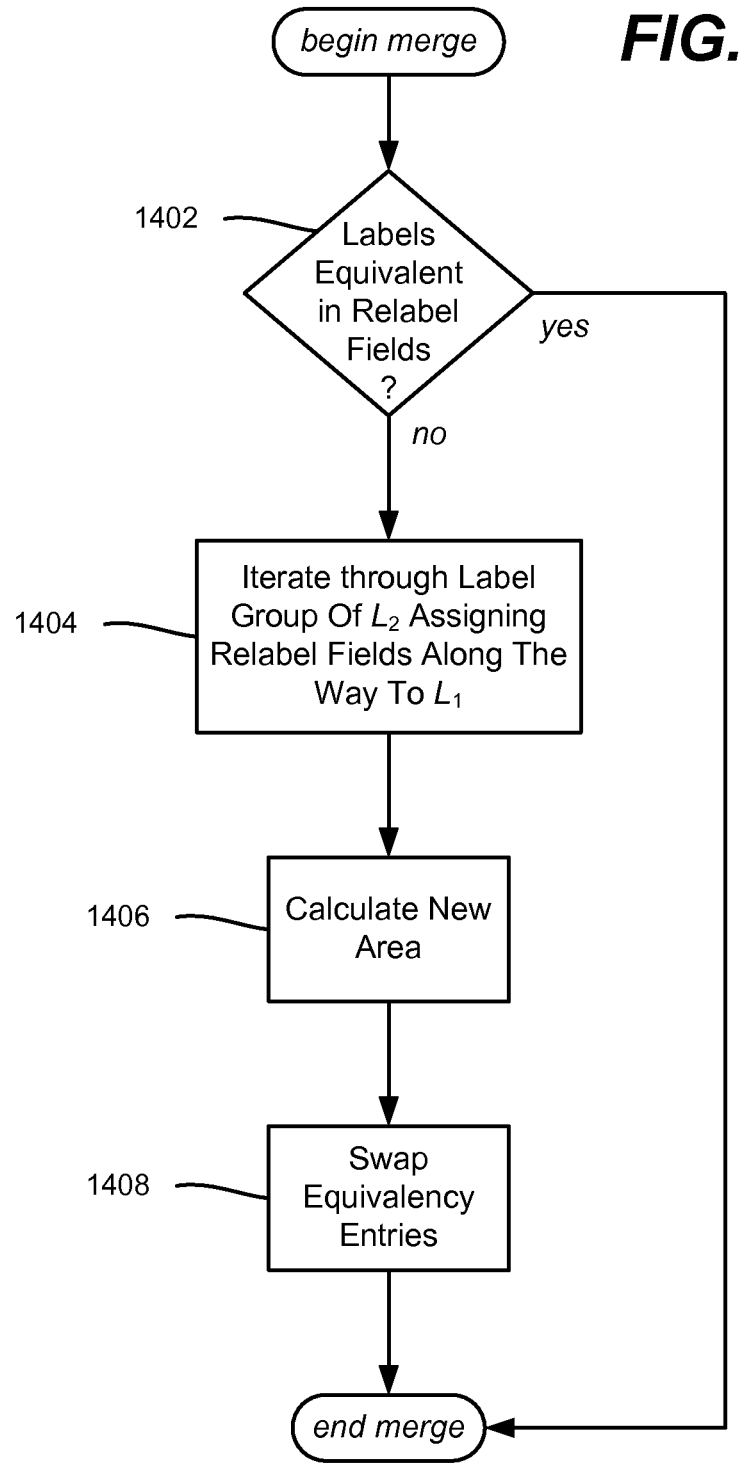
FIG. 14 is a flow diagram representing example steps of merging, according to one or more example implementations.

FIG. 14 is an example flow diagram generally representing aspects of the merge operation in the above pseudo-code. Step 1402 represents checking to see if labels are equivalent in Relabel fields, and if so, exits. That is, step 1402 checks to see if the labels should be merged by reading the Relabel entries for $L_1$ and $L_2$. For correctness, labels are not merged if they are already equivalent to each other (i.e. Relabel[$L_1$] and Relabel[$L_2$] point to the same label).

If not equivalent, step 1404 iterates through the label group of $l_2$ (by going through consecutive equivalency lookups until finding a field that points back to where it started), assigning relabel fields along the way to $l_1$. Note that although the action may dictate merging $L_1$ and $L_2$, the actual operation merges the head labels for the group of labels to which $L_1$ and $L_2$ are equivalent. More particularly, if the labels need to be merged, step 1404 traverses the entire label group that is equivalent to $L_2$, overwriting the "head" label with the "head" label of $L_1$'s label group (i.e., the do . . . while loop iterates over the $L_2$ label group, overwriting Relabel[tempLabel] with Relabel[$L_1$]).

After the entire $L_2$ label group points to the new head label, the do . . . while loop exits. Step 1406 represents calculating the new area for the label group. Via step 1408, the process combines the two linked lists for the label groups, which is accomplished by swapping the Equivalency entries, which effectively opens the two circular lists and connects the ends to each other.

Turning to another aspect, the following table provides information with respect to potential conflicts that may result in merging:

| | | Time t = 0 | | |
|---|---|---|---|---|
| | | New Label L | Inherit Label L | Merge $L_2$ into $L_1$ |
| Time t = 1 | New Label $L^+$ | No Conflict Possible | No Conflict Possible | No Conflict Possible |
| | Inherit Label $L^+$ | No Conflict Possible | No Conflict Possible | No Conflict Possible |
| | Merge $L^+_2$ into $L^+_1$ | $L^+_1$ cannot equal L, $L^+_2$ may equal L Need forwarding | $L^+_1$ may equal L, $L^+_2$ may equal L Need forwarding | $L^+_1$ may equal $L_1$, $L^+_2$ cannot equal $L_2$, $L^+_2$ may equal $L_1$, $L^+_2$ cannot equal $L_2$ |

The first column in the table shown in the describes the potential label conflicts between back-to-back actions in which the first action was a Generate New Label command. By definition, two back-to-back Generate New Label commands cannot conflict with each other (the label for the subsequent action, $L+$, cannot be equal to the label for the previous, L). This is because $L^+$ needs to be a label greater than L.

Similarly, an inherit label command that immediately follows a Generate New Label command is unable to conflict. This is because the processing technique described herein handles subsequent pixels that "match" with L within the Generate New Label command; (that is, the Generate New Label command is not emitted, but rather the Run Length is increased).

A Merge Label command that immediately follows a Generate New Label command has limited conflict potential. As shown in FIGS. 15A-15E, (which provide examples of potential conflicts between back-to-back connected component actions, and in which underlined disparity values indicate the location of a conflict), only the label to be merged, $L^+_2$, may be equal to the previously generated label, L. This is because the target label that is being merged into, $L^+_1$, is by definition the highest numerical label in the system. As described herein, in one or more implementations, larger labels always merge into smaller labels. Thus, while L may immediately merge with smaller labels, other pre-existing smaller labels will not attempt to merge into L. This issue may be addressed with simple forwarding logic.

Turning to performance considerations, in one or more example implementations, a Generate New Label command uses one write into the tracking table—a full write across the three entries for label L. This write can be performed streaming in a single cycle. However, if the write latency of the tracking table memory is greater than one, this may slightly complicate the stream processing for subsequent commands.

An Inherit Label command uses two sequential reads followed by a write in one or more example implementations. The first read retrieves Relabel[L]. The second read uses this value to retrieve Area[Relabel[L]]. Area[Relabel[L]] is then overwritten after computing the new area. The sequential nature of these operations slightly complicates the handling of an Inherit Label command in a pure streaming manner, in that although the Label Tracking stage of connected components processing (including the associated tracking memory) may run at triple the nominal clock rate (e.g. 300 MHz vs. 100 MHz for the rest of the system), this implies that the tracking table memory has a one-cycle read latency, which may not be reliable. This would break the pure streaming nature of the system. However, any potential mismatch in terms of processing throughput between the Label Tracking and Label Assignment stages may be mitigated, beyond additional overclocking. For example, a second action processing computational core may be added that is able to begin processing the next action immediately during the next 100 MHz cycle. This computational core utilizes the idle time in the tracking table memory (i.e. in the description above, every other cycle the memory is idle while the system waits for the read value to return from the memory), allowing the system as a whole to maintain an aggregate throughput of processing one action per 100 MHz cycle with minimal additional hardware.

Although both action computation cores can process unrelated back-to-back actions independently, these actions may involve common labels. The second column of the above "conflicts" table shows potential label conflicts between back-to-back actions in which the first action was an Inherit Label command. By definition, a Generate New Label command cannot conflict when it immediately follows an Inherit Label command (i.e. the label for the subsequent action, L+, needs to be a new label and thus cannot be equal to the label for the Inherit Label command, L).

Furthermore, an Inherit Label command that immediately follows another Inherit Label command cannot conflict (i.e. the label for the second Inherit Label command, L+, cannot equal the label for the first Inherit Label command, L). As before, this is because the processing technique described in the previous section folds subsequent pixels that "match" with L into the first Inherit Label command (the Inherit Label command is not emitted, but rather the Run Length is increased).

However, a label in a Merge Label command that immediately follows an Inherit Label command may conflict. As shown in FIGS. 15D and 15E, the label that is being merged into, L+1, or the label to be merged, L+2, may be equal to the previously generated label, L. As before, any potential problem with incorrect area calculations can be addressed with proper forwarding logic.

A Merge Label command requires at least one pair of reads to retrieve Relabel[$L_1$] and Relabel[$L_2$]. Assuming the two-cycle read latency from earlier, this means that, similar to the two reads required by an Inherit Label command, the second read will return before the fifth (e.g., 300 MHz) cycle. Thus, if the merge is canceled because the two labels are already equivalent to each other, this computational core exits processing and is able to accept a new action during the next (e.g., 100 MHz) cycle.

If the merge is not cancelled, the computational core enters the do . . . while loop described above. For each label in the $L_2$ label group, the core performs one write (updating the label "head" stored in the Relabel[tempLabel] field), and one read (to update tempLabel to Equivalency[tempLabel]).

After the entire $L_2$ label group has been updated, the system issues two reads to re-read Area[Relabel[$L_1$]] and Area[mergeLabel] and one write to update Area[Relabel[$L_1$]]. The system will perform two reads and two writes to update Equivalency[Relabel[$L_1$]] and Equivalency[tempLabel]). Assuming the same two-cycle read latency and interleaving structure described above, this will require a total of four (e.g., 100 MHz) cycles.

Thus, (in the example of 100 MHz cycles) the execution time to perform a merge is either two 100 MHz cycles to evaluate and cancel merges (since the system as described has dual processing cores, a processing time of two 100 MHz cycles retains streaming throughput), and ((0.67*average label group size)+4) 100 MHz cycles to collate valid merges.

Note that when the Label Tracking system encounters a merge action, the other computational core can continue processing new work, until it encounters another merge action. That is, Generate New Label and Inherit Label actions can be processed independently from one another. However, Merge Label actions are not independent in the sense that actions that were issued before the Merge Label action was issued need to be applied before the merge is performed. This is includes prior Generate New Label, Inherit Label and Merge Label actions. Beyond this, Generate New Label and Inherit Label actions that were issued after a Merge Label action was issued may be processed earlier without affecting the results of the merge. This is because Generate New Label actions are independent from prior bookkeeping and any future Inherit Label actions that are performed earlier only update the area of "old" labels. These updates will be collated by the pending merge. After the merge is applied, any additional Inherit Label actions that retain a pointer to the old label are applied to the new entry in the respective Relabel field.

Because label tracking can be slower than the nominal processing rate when performing merges, actions passed from the label assignment stage to the label tracking stage are queued to accommodate this mismatch in processing throughput. Further, label assignment creates fewer actions; that is, by caching potential actions for one cycle to determine if the action generated by the next pixel can be combined with the previous action, in the average case fewer actions need to be processed by the label tracking stage. This compression of actions gives the label tracking stage additional cycles to process merges and catch up to "real time", or where the label assignment core is currently processing.

Still further, to provide for effective stream processing, the labeling behavior of both typical and worst-case images may be characterized. More particularly, the merging behavior may be analyzed to determine the frequency of merging and the average size of label groups when merging occurs. This is behavior is input dependent, but for applications in which connected components is appropriate, minimal overclocking beyond the nominal input data rate may be needed to maintain streaming capabilities.

Example Operating Environment

Figure 16:
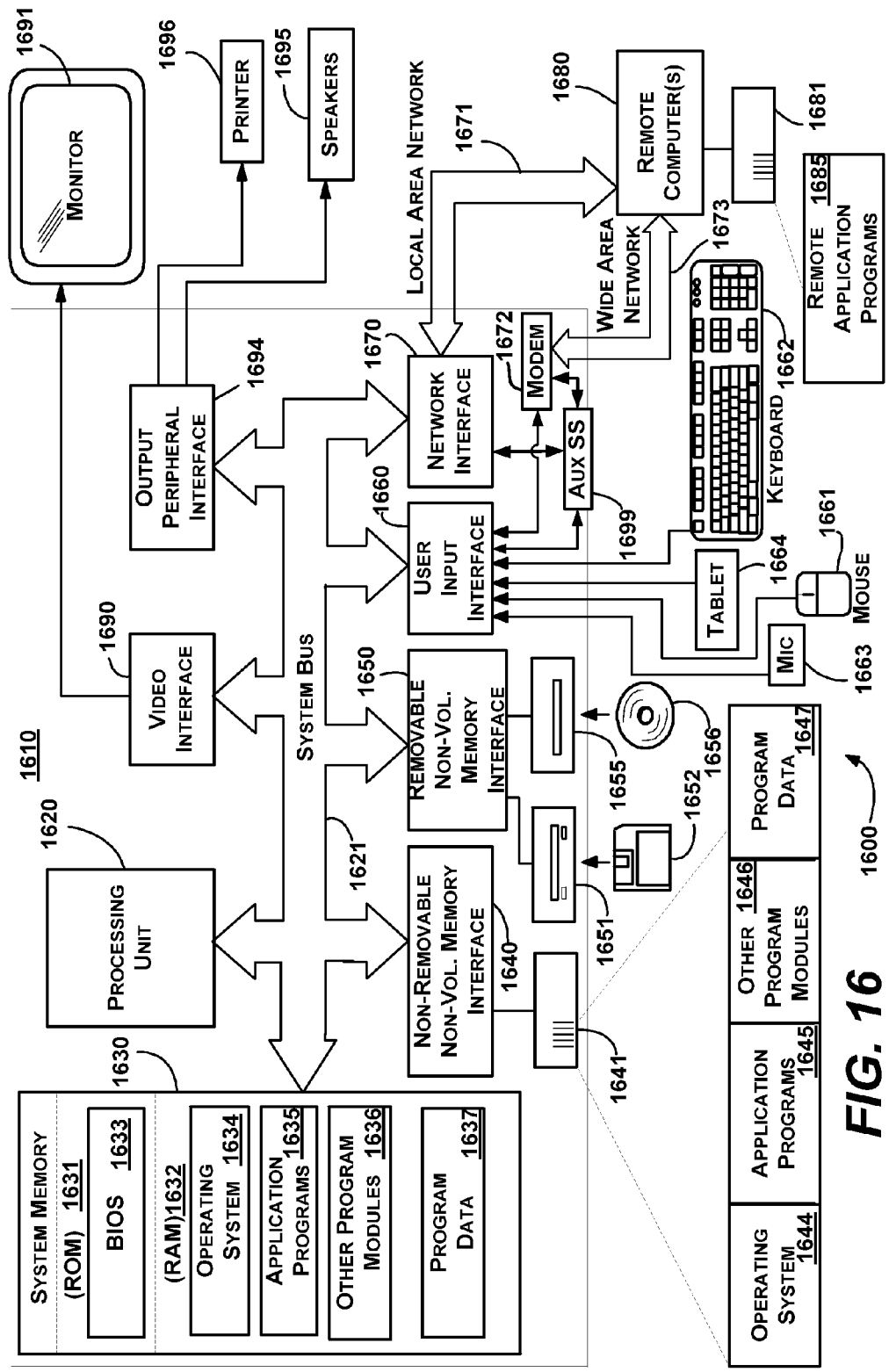
FIG. 16 is a block diagram representing an exemplary non-limiting computing system or operating environment into which one or more aspects of various embodiments described herein can be implemented.

FIG. 16 illustrates an example of a suitable computing and networking environment 1500 into which computer-related examples and implementations described herein may be implemented, for example. As one example, the computing and networking environment 1600 may program an FPGA with data and/or logic to perform connected components labeling as described herein, provide input data, receive output data, and so forth. Notwithstanding, the computing and networking environment 1600 also may implement the technology described in FIGS. 1-15E in software, at least in part.

The computing system environment 1600 is only one example of a suitable computing environment and is not intended to suggest any limitation as to the scope of use or functionality of the invention. Neither should the computing environment 1600 be interpreted as having any dependency or requirement relating to any one or combination of components illustrated in the example operating environment 1600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 16, an example system for implementing various aspects of the invention may include a general purpose computing device in the form of a computer 1610. Components of the computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1610 typically includes a variety of computer-readable media. Computer-readable media can be any available media that can be accessed by the computer 1610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636 and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface, such as interface 1650.

The drives and their associated computer storage media, described above and illustrated in FIG. 16, provide storage of computer-readable instructions, data structures, program modules and other data for the computer 1610. In FIG. 16, for example, hard disk drive 1641 is illustrated as storing operating system 1644, application programs 1645, other program modules 1646 and program data 1647. Note that these components can either be the same as or different from operating system 1634, application programs 1635, other program modules 1636, and program data 1637. Operating system 1644, application programs 1645, other program modules 1646, and program data 1647 are given different numbers herein to illustrate that, at a minimum, they are different copies. A user may enter commands and information into the computer 1610 through input devices such as a tablet, or electronic digitizer, 1664, a microphone 1663, a keyboard 1662 and pointing device 1661, commonly referred to as mouse, trackball or touch pad. Other input devices not shown in FIG. 16 may include a joystick, game pad, satellite dish, scanner, or the like. These and other input devices are often connected to the processing unit 1620 through a user input interface 1660 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. The monitor 1691 may also be integrated with a touch-screen panel or the like. Note that the monitor and/or touch screen panel can be physically coupled to a housing in which the computing device 1610 is incorporated, such as in a tablet-type personal computer. In addition, computers such as the computing device 1610 may also include other peripheral output devices such as speakers 1695 and printer 1696, which may be connected through an output peripheral interface 1694 or the like.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include one or more local area networks (LAN) 1671 and one or more wide area networks (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660 or other appropriate mechanism. A wireless networking component 1674 such as comprising an interface and antenna may be coupled through a suitable device such as an access point or peer computer to a WAN or LAN. In a networked environment, program modules depicted relative to the computer 1610, or portions thereof, may be stored in the remote memory storage device. By way of example, and not limitation, FIG. 16 illustrates remote application programs 1685 as residing on memory device 1681. It may be appreciated that the network connections shown are examples and other means of establishing a communications link between the computers may be used.

An auxiliary subsystem 1699 (e.g., for auxiliary display of content) may be connected via the user interface 1660 to allow data such as program content, system status and event notifications to be provided to the user, even if the main portions of the computer system are in a low power state. The auxiliary subsystem 1699 may be connected to the modem 1672 and/or network interface 1670 to allow communication between these systems while the main processing unit 920 is in a low power state.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System on chip systems (SOCs), Complex Programmable Logic Devices (CPLDs), etc.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. A method comprising:
performing collected components processing, wherein
performing collected components processing includes:

maintaining a relabeling data structure comprising labels;

labeling vertices of a graph based upon labeling rules;

detecting a merge condition when a first set of one or more pixels has two intersecting arcs connecting the first set of one or more pixels to two neighbor pixels labeled with conflicting labels;

accessing the relabeling data structure based upon the merge condition; and propagating a label from one of the two neighbor pixels to the first one or more pixels through associating an inherited label with the first one or more pixels in which the inherited label is inherited from one of the two neighbor pixels when a disparity threshold comparison with the one of the two neighbor pixels is met.

2. The method of claim 1 wherein the graph represents pixels of an image, and wherein the method further comprises traversing the graph in raster order to reach a selected pixel.

3. The method of claim 1 wherein accessing the relabeling data structure based upon the merge condition comprises swapping equivalency data associated with one labeled pixel with equivalency data associated with another labeled pixel.

4. The method of claim 3 wherein swapping the equivalency data comprises generating a closed loop.

5. The method of claim 1 wherein accessing the relabeling data structure based upon the merge condition comprises modifying at least one relabel data entry.

6. A system comprising:

a label management component; and a label assignment component for communication with the label management component, the label assignment component configured to:

evaluate disparity data between a first pixel and two neighbor pixels;

based upon the disparity data, associate a label with the first pixel, wherein associating a label with the first pixel comprises associating an inherited label with the first pixel in which the inherited label is inherited from one neighbor pixel when a disparity threshold comparison with the one neighbor pixel is met; and communicate the associated label of the first pixel to the label management component.

7. The system of claim 6, wherein associating a label with the first pixel comprises generating and associating a new label with the first pixel when a disparity threshold comparison with either of the neighbor pixels is not met.

8. The system of claim 6, wherein associating a label with the first pixel additionally comprises associating an inherited label with the first pixel when a disparity threshold comparison with another neighbor pixel is not met.

9. The system of claim 6, wherein associating a label with the first pixel comprises associating an inherited label with the first pixel in which the inherited label is inherited from one neighbor pixel when a disparity threshold comparison with both neighbor pixels is met and both neighbor pixels have the same label.

10. The system of claim 6, wherein associating a label with the first data element comprises associating an inherited label with the first pixel in which the inherited label is inherited from one neighbor pixel when a disparity threshold comparison with both neighbor pixels is met and both neighbor pixels do not have the same label, and to perform a merge operation to associate both neighbor pixels with a common label.

11. The system of claim 6, wherein the label management component computes in raster-scan order.

12. The system of claim 6, wherein the label management component buffers one row of both disparity and label information.

13. The system of claim 12, further comprising a memory area having a queue that includes a disparity cache and a label cache, the queue having N stages to hold an entire width of an image and storing values for locations side by side.

14. One or more computer-storage memories comprising computer-executable components, the components comprising:

a label management component; and a label assignment component that when executed by at least one processor causes the at least one processor to:

communicate with the label management component to obtain label data associated with pixels;

enable stream processing through buffering a row of the data elements, said stream processing providing access to disparity data between a first pixel and two neighbor pixels;

evaluate the disparity data between the first pixels and the two neighbor pixels; and based upon the disparity data, communicate with the label management component to associate a label with the first pixel, wherein associating a label with the first pixel comprises associating an inherited label with the first pixel in which the inherited label is inherited from one neighbor pixel when a disparity threshold comparison with the two neighbor pixels is met.

15. The one or more computer-storage memories of claim 14, wherein associating a label with the first pixel comprises generating and associating a new label with the first pixel when the disparity threshold comparison with either of the neighbor pixels is not met.

16. The one or more computer-storage memories of claim 14, wherein associating a label with the first pixel comprises associating the inherited label with the first pixel in which the inherited label is inherited from one neighbor pixel when the disparity threshold comparison with another neighbor pixel is not met.

17. The one or more computer-storage memories of claim 14, wherein associating a label with the first pixel comprises associating the inherited label with the first pixel when the disparity threshold comparison with both neighbor pixels is met and both neighbor pixels have the same label.

18. The one or more computer-storage memories of claim 14, wherein associating a label with the first pixel comprises associating the inherited label with the first pixel in which the inherited label is inherited from one neighbor pixel when the disparity threshold comparison with both neighbor pixels is met and both neighbor pixels do not have the same label, and to perform a merge operation to associate both neighbor pixels with a common label.

19. The one or more computer-storage memories of claim 14, wherein the label management component, when executed by at least one processor, causes the at least one processor to:

determine whether a current label points to itself;

upon determining that the current label points to itself, determine whether a destination label has been visited;

upon determining that the destination label points to itself, travel to the initial label; and upon determining that the destination label does not point to itself, analyze the destination address.

20. The one or more computer-storage memories of claim 14, wherein the label management component, when executed by at least one processor, causes the at least one processor to buffer one row of both disparity and label information.

* * * * *